US007855957B2

(12) United States Patent
Madhi, II et al.

(10) Patent No.: US 7,855,957 B2
(45) Date of Patent: Dec. 21, 2010

(54) METHOD AND SYSTEM OF TRANSMIT LOAD BALANCING ACROSS MULTIPLE PHYSICAL PORTS

(75) Inventors: Nambi K. Madhi, II, Austin, TX (US); Michael Sean McGee, Austin, TX (US); Darda M. Chang, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 11/468,577

(22) Filed: Aug. 30, 2006

(65) Prior Publication Data

US 2008/0056122 A1     Mar. 6, 2008

(51) Int. Cl.
*H04J 1/16*     (2006.01)
(52) U.S. Cl. .................. 370/230; 370/229; 370/230.1
(58) Field of Classification Search .......... 370/229–240
See application file for complete search history.

(56) References Cited

U.S. PATENT DOCUMENTS

| | | | | |
|---|---|---|---|---|
| 5,479,407 A * | 12/1995 | Ko et al. | ..................... | 370/231 |
| 6,011,775 A * | 1/2000 | Bonomi et al. | .............. | 370/230 |
| 6,078,566 A * | 6/2000 | Kikinis | ....................... | 370/286 |
| 6,115,372 A * | 9/2000 | Dinha | ........................ | 370/352 |
| 6,256,295 B1 * | 7/2001 | Callon | ........................ | 370/254 |
| 6,778,523 B1 * | 8/2004 | Masilamany | ................ | 370/351 |
| 7,372,813 B1 * | 5/2008 | Cimino et al. | .............. | 370/235 |
| 7,590,149 B1 * | 9/2009 | Bharali et al. | ............... | 370/468 |
| 7,602,717 B1 * | 10/2009 | Shenoy et al. | ............... | 370/235 |
| 2006/0153110 A1 * | 7/2006 | Morgan et al. | .............. | 370/310 |

OTHER PUBLICATIONS

Bryant, Chris. How and Why to Build an Etherchannel. <http://web.archive.org/web/20060325121313/http://www.mcmcse.com/cisco/guides/etherchannel.shtml> Mar. 25, 2006.*
Cisco. How Does Unequal Cost Path Load Balancing (Variance) Work in IGRP and EIGRP?. Mar. 8, 2005. <http://web.archive.org/web/20050308133442/http://www.cisco.com/en/US/tech/tk365/technologies_tech_note09186a008009437d.shtml>.*
V. Alwayn. Advanced MPLS Design and Implementation. Cisco Press. 2002. pp. 186.*

* cited by examiner

*Primary Examiner*—William Trost, IV
*Assistant Examiner*—Ashil Farahmand (57) ABSTRACT

A method and system of transmit load balancing across multiple physical ports. At least some of the illustrative embodiments are methods comprising teaming a first and second communication ports to create a teamed communication port, creating a plurality of virtual ports which abstract the first and second communication ports (and wherein a number of virtual ports utilizing each communication port is based on parameters associated with the communication ports), selecting one of the plurality of virtual ports out which to send a message packet thus designating a select virtual port (the selecting implements transmit load balancing across plurality of virtual ports) and sending the message packets out the first or second communication port utilized by the selected virtual port.

11 Claims, 6 Drawing Sheets

METHOD AND SYSTEM OF TRANSMIT LOAD BALANCING ACROSS MULTIPLE PHYSICAL PORTS

BACKGROUND

In order to implement communication fault tolerance, and in some cases increase data throughput, a computer system may couple to a network by way of a plurality of communication ports (hereinafter just ports), with the ports either implemented on a single network interface card (NIC) or the ports implemented on multiple NICs. The communication ports are "teamed" such that, regardless of the actual number of ports, the ports appear as a single port to application level programs.

In some cases, a primary port both sends and receives all communication packets, with the non-primary ports idled until such time as the primary port experiences a fault. In the case of a fault, one of the non-primary ports becomes primary, and the new primary sends and receives all communication packets. In other cases, when all the ports have the same bandwidth capability, message packets transmitted to clients on the network are distributed across the ports. However, transmit load balancing in situations where the ports have differing bandwidth capabilities, or where ports with the same bandwidth capabilities have differing connectivity the network, is not attempted. If a port has diminished capability (either because of its design or its connectivity to the network), the port is not used.

BRIEF DESCRIPTION OF THE DRAWINGS

For a detailed description of illustrative embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections

DETAILED DESCRIPTION

The following discussion is directed to various embodiments. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
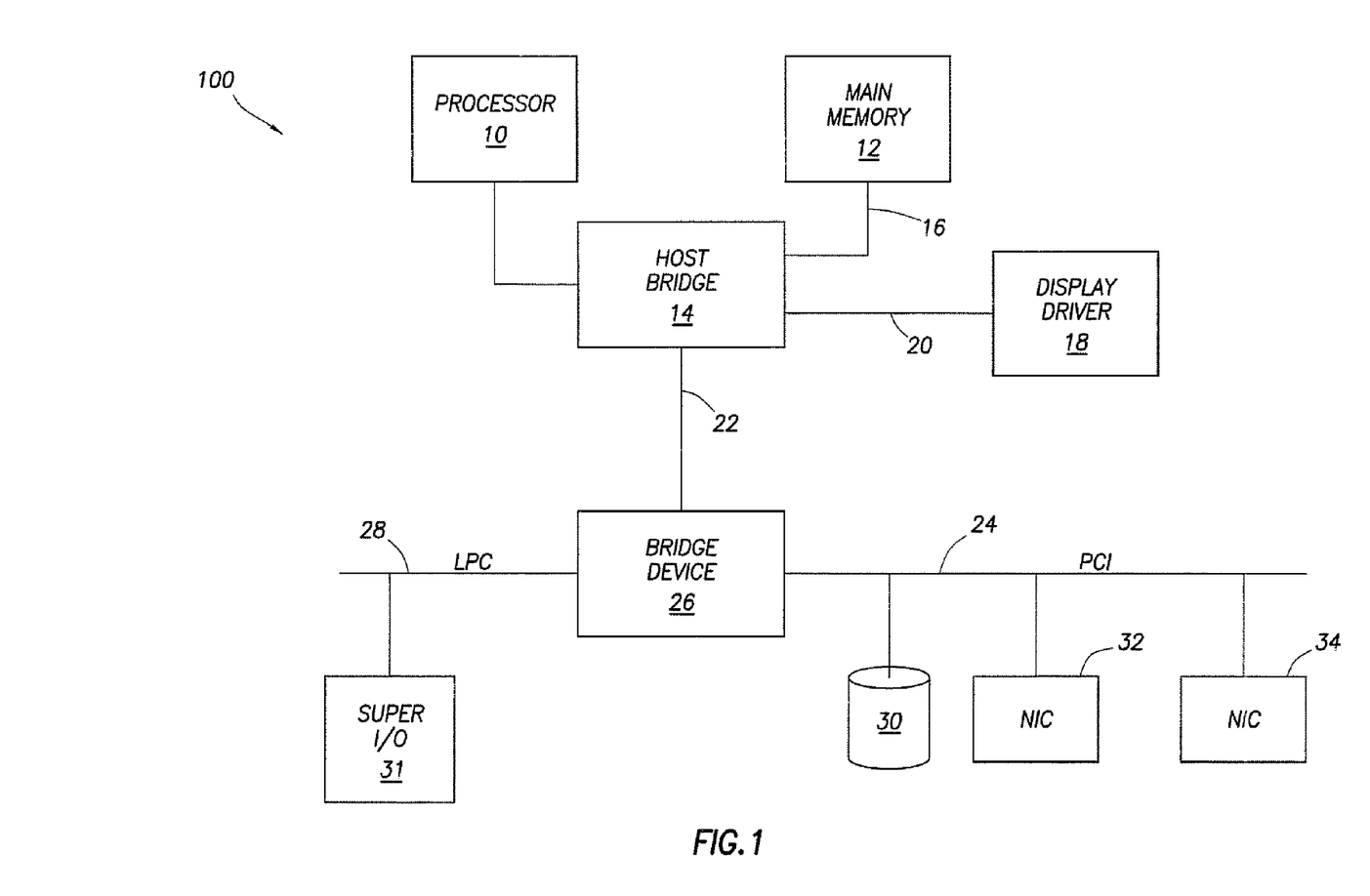
FIG. 1 illustrates a computer system in accordance with at least some embodiments.

FIG. 1 illustrates a computer system 100 in accordance with at least some embodiments. In particular, computer system 100 comprises at least one processing circuit or processor 10. In alternative embodiments the computer system 100 comprises multiple processors arranged in a configuration where parallel computing may take place. The processor 10 couples to a main memory array 12, and a variety of other peripheral computer system components, through a host bridge logic 14, although in some embodiments the host bridge logic 14 may be integrated with the processor 10. The main memory array 12 couples to the host bridge logic 14 through a memory bus 16. The host bridge logic 14 controls transactions to the main memory 12 by asserting control signals during memory accesses. The main memory 12 functions as the working memory for the processor 10 and comprises a memory device or array of memory devices in which program instructions and data are stored. The main memory array 12 may comprise any suitable type of memory, such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

In some embodiments, text and video generated by software executing on the processor is provided to a display driver device 18 coupled to the host bridge 14 by way of an Advanced Graphics Port bus 20, PCI-Express, or other suitable type of bus. Alternatively, the display driver device could couple to the primary expansion bus 22 or one of the secondary expansion buses (i.e., the peripheral component interconnect (PCI) bus 24). The display device to which the display driver device 18 couples may comprise any suitable electronic display device upon which any image or text can be represented. In embodiments where the computer system 100 is a server system (e.g., in rack mounted enclosure with a plurality of other server systems), the display driver 18 may be omitted.

Computer system 100 also comprises a second bridge logic device 26 that bridges the primary expansion bus 22 to various secondary buses, such as a low pin count (LPC) bus 28, the PCI bus 24, and a Universal Serial Bus (USB). These secondary expansion buses are only illustrative, and other secondary expansion buses and bus protocols now in existence, or after-developed, may be equivalently used. In some embodiments, the bridge logic device 26 is an Input/Output (I/O) Controller Hub (ICH) manufactured by Intel Corporation. In the embodiments shown in FIG. 1 using an I/O Controller Hub as the second bridge logic device, the primary expansion bus 22 is a Hub-link bus, which is a proprietary bus of the Intel Corporation. However, computer system 100 is not limited to any particular chipset vendor, and thus other suitable buses as well as chipsets from other manufacturers may be equivalently used.

A Super Input/Output (I/O) controller 32 couples to the second bridge logic device 26 and controls many system functions. The Super I/O controller 32 may interface, for example, with a system pointing device, such as a mouse, a keyboard, and various serial ports and floppy drives. The Super I/O controller is referred to as "super" because of the many I/O functions it may perform. Because in some embodiments the computer system 100 is a server, the server may not have a dedicated mouse and keyboard.

Still referring to FIG. 1, the computer system 100 may further comprise a long term data storage device, such as disk drive system 30 coupled to the bridge logic device 26 by way of the illustrative PCI bus 24. The disk drive system 30 may be a single drive, or an array of drives operated as a redundant array of independent (or inexpensive) disks (RAID) system. While the illustrative disk drive system 30 is shown as coupled to the PCI bus 24, the disk drive system may equivalently couple to other buses, such as the primary expansion bus 22 or other secondary expansion buses.

The computer system 100 further comprises a plurality of network interface cards (NICs) or other form of network adapters. In the illustrative case of FIG. 1, the computer system 100 comprises NICs 32 and 34. The NICs 32 and 34 are message interfaces between the computer system 100 and one or more communication networks, such as an Ethernet network implementing a local area network (LAN) or wide area network (WAN). While FIG. 1 illustrates both NICs 32 and 34 coupled to the same PCI bus 24, in alternative embodiments the NICs may couple to different PCI buses, or buses having different communication protocols (e.g., one NIC coupled to the PCI bus, and a second NIC coupled to the primary expansion bus 22) to implement bus fault tolerance. Each NIC 32 and 34 implements at least one physical communication port, and each NIC may implement multiple physical communication ports. For example, a NIC may implement four or eight physical communication ports, and thus a NIC may implement four or eight separately controllable interfaces to four or eight different communication networks.

In accordance with some embodiments, two or more physical communication ports (hereinafter just "physical ports") may be grouped or teamed for purposes of fault tolerance and/or to increase communication throughput. Teamed physical ports may be implemented on the same NIC device, or the ports may span multiple NIC devices. Moreover computer system 100 may implement multiple teams. Teamed physical ports represent redundant links to the communication network, and in some cases each physical port may communicate over distinct paths or segments of the network that ultimately couple to a core switch.

If employed in a packet-switched network, each of the NICs 32 and 34 of FIG. 1 transmit to and receive from the network packets (e.g., Ethernet formatted packets) generated by clients on the network. The formatting of the packets is defined by the implemented transmission protocol. Each device on a network uses one or more unique addresses by which it communicates with the other devices on the network, with each address (corresponding to one of the layers of the OSI model) embedded in the packets for both the source device and the destination device. A device uses an address at layer 2 (the data link layer) known as a media access control (MAC) address and an address at layer 3 (the network layer) known as a protocol address (e.g., Internet Protocol (IP), IP eXchange (IPX), AppleTalk). The MAC address can be thought of as being assigned to the physical hardware of the device, such as the NIC, whereas the protocol address is assigned to the software of the device. When multiple protocols reside on the same network device, a protocol address is usually assigned to each resident protocol.

For Ethernet networks, devices communicate directly using their respective layer 2 MAC addresses, even though the software for each device initiates communication with one or more other network devices using their protocol addresses. Ethernet devices first ascertain the MAC address corresponding to a particular protocol address of a destination device. For the IP protocol, this is accomplished by first consulting a cache of MAC address/protocol address pairs maintained by each network device. If an entry for a particular protocol address is not present, a process is initiated whereby the sending device broadcasts a request to all devices on the network requesting that the device having the destination protocol address reply with its MAC address. This is known as address resolution protocol (ARP) request, the result of which is then stored in the cache. Communication packets are formed by embedding the source and destination MAC addresses (48 bits each), as well as embedding the source and destination protocol addresses, in the payload of the packet. The source protocol address indicates to the receiving device the identity of the source device from which the packet was received and thus to which device to respond if a response is required. For the IPX protocol, the ARP process is not needed as the MAC address is a constituent of the IPX address.

Figure 2:
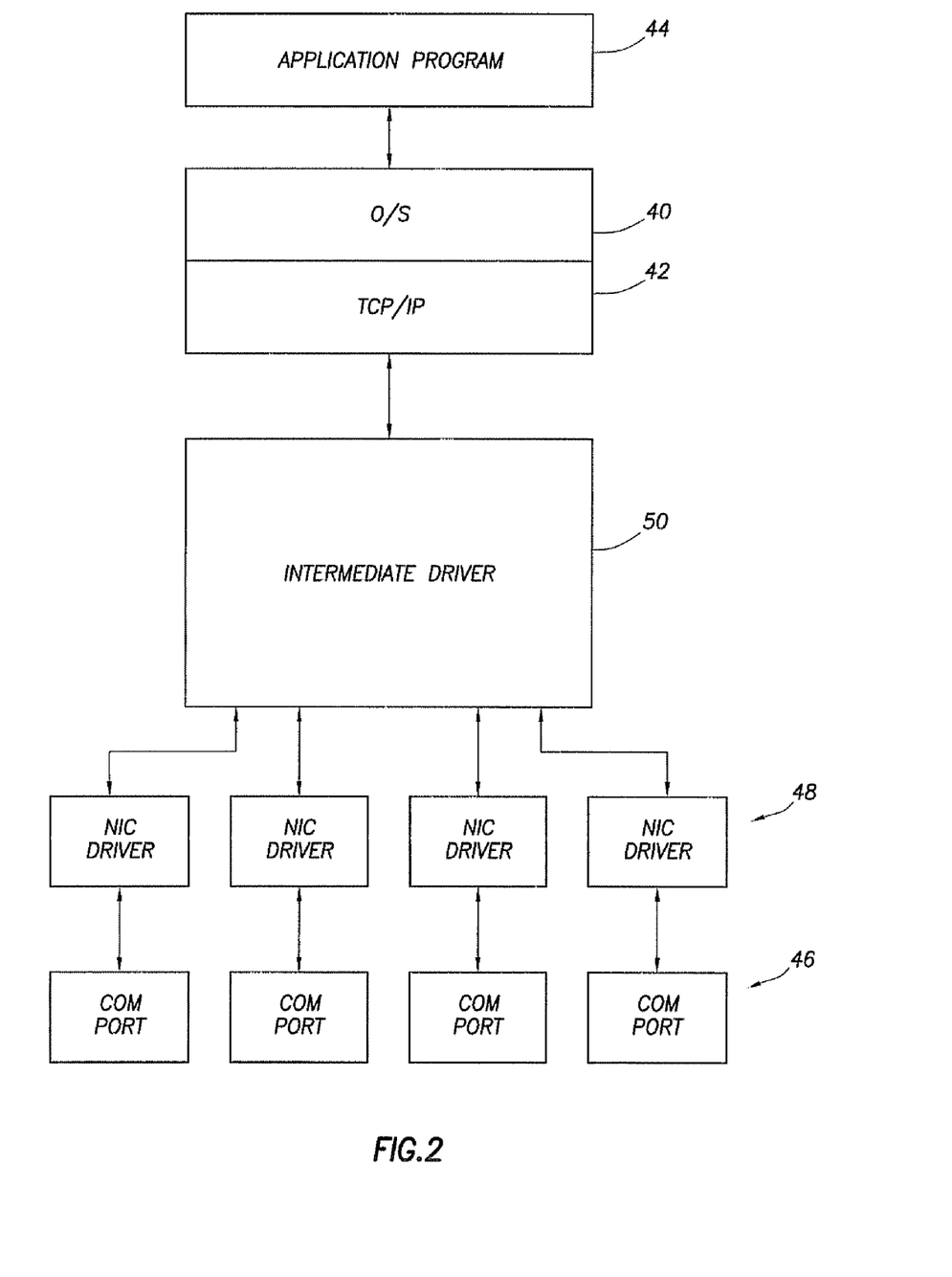
FIG. 2 illustrates the relationship of various software programs and/or drivers in accordance with at least some embodiments.

FIG. 2 illustrates the relationship of various pieces of software executed by the processor 10 to implement teaming in accordance with some embodiments. In particular, the computer system implements an operation system (O/S) 40 that supports networking. Any currently available or after developed operating system that supports networking may be used. In the illustrative case of FIG. 2, the operating system 40 supports a transmission control protocol/internet protocol (TCP/IP) stack 42, but other communication protocols may be implemented simultaneously or in the alternative (e.g., IPX, NetBUEI). The operating system 40, and in particular the illustrative TCP/IP protocol stack 42, enable one or more application programs 44 to communicate to other computer systems over a network.

Still referring to FIG. 2, each physical port 46 has associated therewith a NIC driver 48 (where each NIC driver may be alternatively referred to as a miniport driver). In cases where each NIC (e.g., NICs 32 and 34 of FIG. 1) are made by the same vendor and have the same capabilities, the NIC drivers 48 may be duplicate programs. However, the NICs need neither be made by the same vendor nor have the same capabilities. For example, one NIC may implement 100 megabit per second (Mbps) data throughput, while another NIC may implement 1000 Mbps (Gigabit) throughput, and in these alternative embodiments the NIC drivers may be vendor and/or capability specific. In spite of having different vendors and/or different capabilities, the various NICs, or their physical ports, may still be teamed in accordance with some embodiments.

In situations where each physical port 46 operates independently, the illustrative TCP/IP stack 42 communicates directly with each NIC driver 48; however, in accordance with at least an embodiment the physical communications ports 46 are teamed such that they appear as a single communication port to the TCP/IP stack 42 and application program 44. To enable teaming, an intermediate driver 50 interfaces between the illustrative TCP/IP stack 42 and the various drivers 48. More particularly, the intermediate driver 50 communicates with the TCP/IP stack 42, and appears to the TCP/IP stack as a single NIC driver. Likewise, the intermediate driver 50 appears as a TCP/IP stack to each of the NIC drivers 48.

Figure 3A:
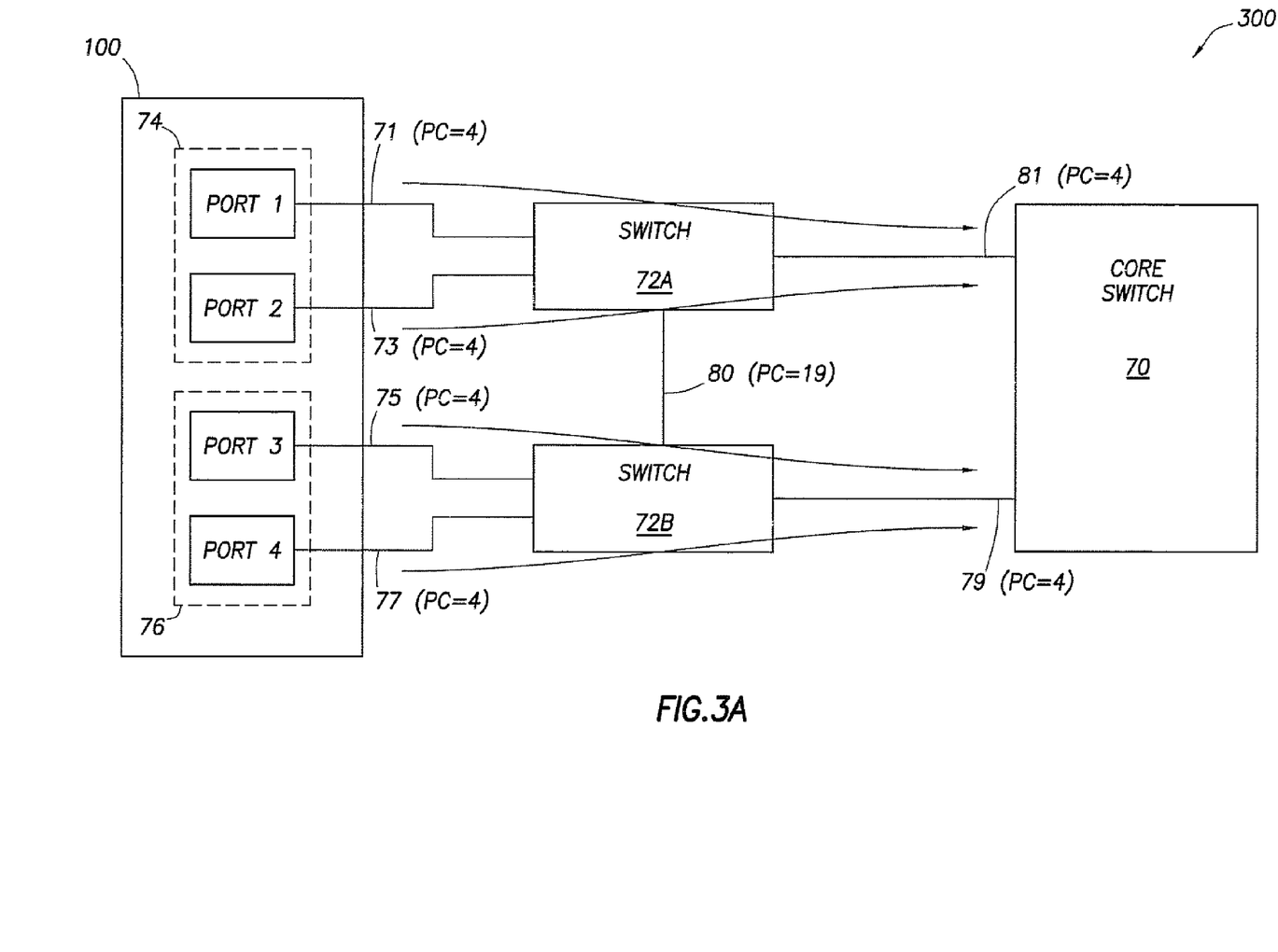
FIG. 3A illustrates a dual switch device system in accordance with some embodiments.

In order to describe transmit load balancing in accordance with at least some embodiments, consider the system of FIG. 3A. In particular, FIG. 3A illustrates computer system 100 coupled to a core switch 70 of a network through two network switch devices 72A and 72B. Of the four teamed physical ports of computer system 100, two physical ports couple to network switch device 72A, and two physical ports couple to network switch device 72B. FIG. 3A shows that physical ports 1 and 2 are implemented by a single NIC 74, while physical ports 3 and 4 are implemented by a single NIC 76, but this implementation is merely illustrative. The four physical ports may be implemented on a single NIC (but such an implementation would not provide NIC redundancy), may be implemented on four separate NICs, or any combination where for physical ports are available. For purpose of discussion, assume that each port couples directly to its respective switch device by way of a Gigabit connection. In particular, ports 1-4 couple to their respective switch devices 72 by way of Gigabit connections 71, 73, 75 and 77 respectively. Likewise assume that each switch device 72 couples directly to the core switch 70 by way of a Gigabit connections 79 and 81. Finally assume that switch devices 72A and 72B couple to each other by way of a 100 Mbps connection 80. Implementing a system such as that shown in FIG. 3A provides NIC redundancy within the computer system 100 and switch device redundancy.

In accordance with some embodiments, computer system 100 (an in particular the intermediate driver 50) implements transmit load balancing across the physical ports by abstracting or virtualizing the ports. In particular, computer system 100 creates a plurality of virtual ports, where each physical port has mapped thereto one or more virtual ports. Stated otherwise, each virtual port uses a physical port, and each physical port may appear, for load balancing decisions, as several virtual ports. Thus, the intermediate driver 50 makes load balancing decisions to load balance transmission of message packets across the virtual ports, rather than the physical ports. Once one of virtual port has been selected as the port out which to send a particular message packet, the intermediate driver determines which physical port to which the selected virtual port maps, and sends the message packet out the proper physical port. The more virtual ports associated with a physical port, the greater the number of message packets that will be transmitted from the physical port. The benefits of virtualizing the physical ports are numerous, including that the load balancing technique need not know or be aware of differing capabilities of the physical ports; rather, each virtual port may be considered to have equal capabilities for load balancing purposes. The number of virtual ports created for each physical port reflects the relative number of message packets to transmit out a particular physical port, and thus the number of virtual ports created for each physical port is based on parameters associated with the physical port.

In the illustrative situation of FIG. 3A, each physical port 1-4 has the same bandwidth and connectivity to the core switch 70. In this situation, the creation of virtual ports for each physical port may take a one-to-one relationship, or the physical ports may have equal numbers of virtual ports assigned thereto. Any currently existing or after-developed load balancing system, which system considers each of the possible ports to have the same capability, may be used in the load balancing decision. However, as the parameters associated with each port change, so too should the load balancing.

Figure 3B:
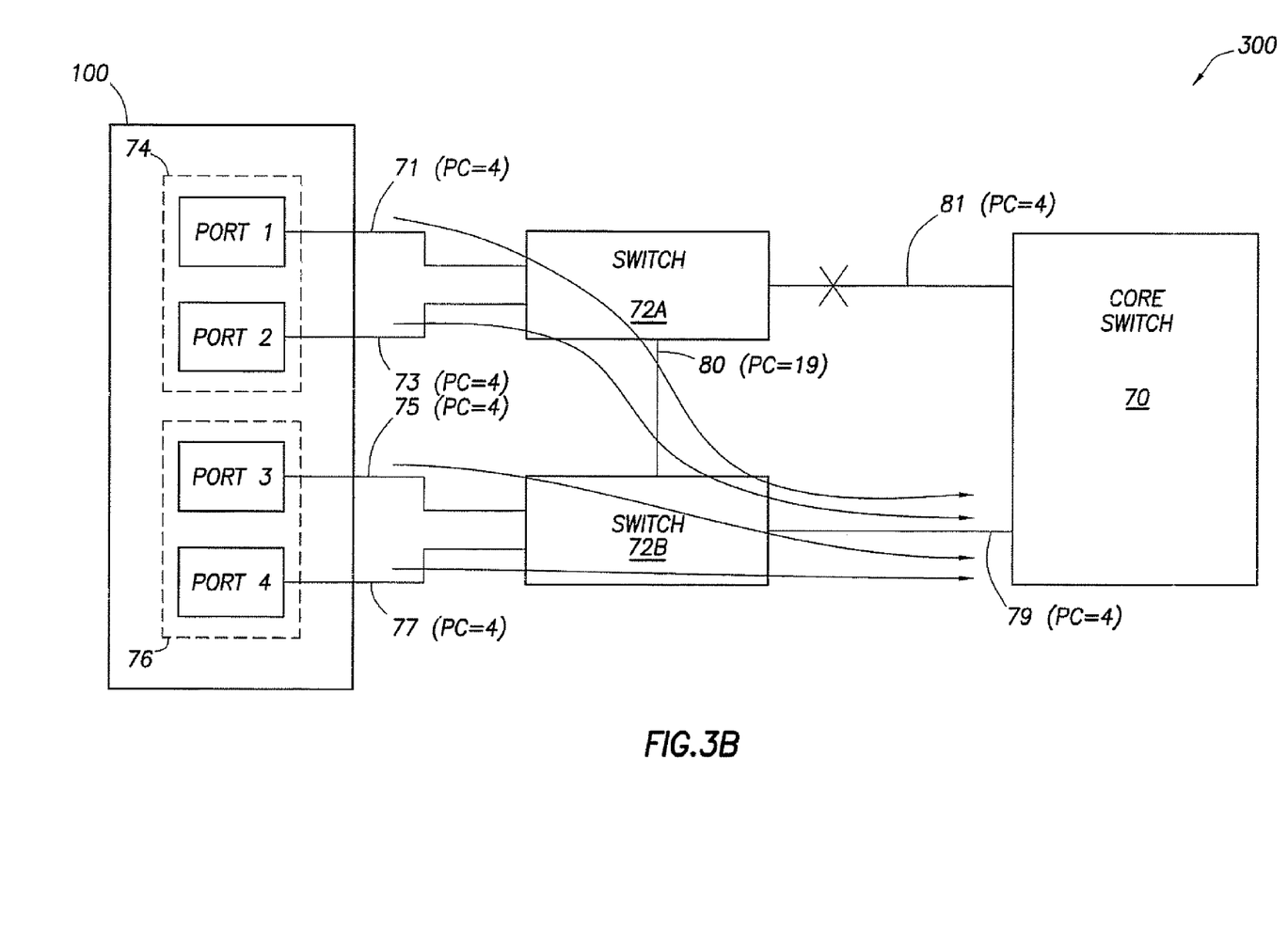
FIG. 3B illustrates a dual switch device system in accordance with some embodiments but with one failed uplink.

Now consider the situation where the physical connection 81 between the network switch device 72A and the core switch 70 is broken, as illustrated in FIG. 3B. By virtue of the 100 Mbps connection between the network switch devices 72A and 72B, ports 1 and 2 will still have connectivity to the core switch 70, but with severely restricted bandwidth through the connection 80. In this situation, at the physical port level a distribution of message packets which assumes each physical port has equivalent bandwidth results in assigning many message packets to severely bandwidth limited physical ports. In order to address this difficulty, and in accordance with some embodiments, the number of virtual ports associated with each physical port is adjusted based on the connectivity of each physical port to the network. The explanation requires a brief digression into spanning tree data.

Information regarding the bandwidth capability of various connections between network devices on a network is often transmitted between contiguous network switch devices on a network segment or subnet. The information is data defining a cost value for each connection in a path, the cost value being inversely related to the bandwidth and the number of hops to the core switch device of the connection (i.e., the cost value is lowest for those connections with the highest bandwidth and the least number of hops to the core switch device, but the cost value does not necessarily relate to a dollar value to use the connection). The cost of a path will be the cumulative cost for all of the connections in the path to the core switch device. For Ethernet networks, a standard for defining this information, and a protocol for transmitting the information between devices, is known as Spanning Tree and is specified under ANSI/IEEE Std 802.1 D.

In at least some embodiments, upon forming a team of ports the intermediate driver 50 (of FIG. 2) establishes an address used to receive the Spanning Tree cost information in accordance with the 802.1 D specification from the network switch devices 72A and 72B. The cost information is transmitted in the form of data called Bridge Protocol Data Units (BPDU). The intermediate driver 50 extracts from the Spanning Tree frames the data defining the cost values for the paths to which its member ports are attached. In some embodiments, when creating virtual ports, the intermediate driver 50 uses the cost data, with the number of virtual ports associated with each physical port proportional to the cost data. The intermediate driver 50 continues to monitor the Spanning Tree data, and whenever the relative costs of the paths to which the team of ports is coupled changes the intermediate driver 50 likewise changes the number of virtual ports to take into account connectivity differences between the physical ports.

In FIG. 3A, all four paths to the core switch 70 have equal cost. In the illustration of FIG. 3A, ports 1-4 couple to the switch devices 72 over Gigabit connections. Likewise, the uplinks between switch devices 72 and the core switch 70 are also Gigabit. Each Gigabit connection may be assessed an equal port cost (PC) value 4 by the Spanning Tree Protocol, which makes the cumulative cost of each path the same (i.e., path cost=8). The link 80 between switch devices 72 is in a standby mode when the uplinks to the core switch 70 are operational. Nevertheless, Spanning Tree assesses this 100 Mbps link a port cost=19, reflective of its significantly lower bandwidth. In FIG. 3B, a failure in the uplink between network switch device 72A and the core switch 70 activates link 80 (port cost=19) to maintain connectivity between network switch device 72A and the core switch 70. As a result, the new cumulative cost for physical ports 1 and 2 to reach the core switch goes from path cost=8 to path cost=27 (4+19+4), while the cost for physical ports 3 and 4 to reach the core switch remains at path cost=8. When the intermediate driver 50 becomes aware of a cost differential between the physical ports, the number of virtual ports is adjusted. In the case of using BPDU as the measure of cost, the number of virtual ports assigned to each physical port is inversely proportional to the BPDU cost data for that physical port (i.e., the lower the BPDU, the greater the number of clients assigned to the port). Advantageously, adjusting the number of virtual ports may take place at any time. That is, the intermediate driver 50 may make virtual port selection for a first message packet, adjust the number of virtual ports, and immediately thereafter make a virtual port selection for the second message packet over the new set of virtual ports. Stated otherwise, the intermediate software 50 may make adjustments that change the effective load balancing at the physical port level with no, or minimal, disruption to transmission of message packets.

The discussion of FIGS. 3A and 3B has assumed that each of the ports 1-4 is a Gigabit port, and that each physical connection supports Gigabit communications even if the connectivity of the physical port is limited by downstream connections. In alternative embodiments, the physical ports 1-4 need not all be Gigabit ports, and instead one or more of the may have greater or lesser bandwidth (e.g., 100 Mbps). The differences in path cost associated with the 100 Mbps physical ports may evidence itself in the BPDU information, or the intermediate driver 50 may utilize bandwidth capabilities directly when creating virtual ports for each physical port.

The bandwidth capability of the physical port and/or the network throughput to which the physical port connects need not be the only considerations when creating virtual ports for each physical port. For example, the administrator of the computer system may have a preference for particular ports, and in such a situation the intermediate driver may create more virtual ports for the physical ports for which there is a preference. Having more virtual ports translates into a greater number of message packets being transmitted from the underlying physical port. Other illustrative considerations when creating virtual ports may be reliability of the physical ports, and/or communication delay associated with each physical port.

As alluded to above, the load balancing system utilized by the intermediate driver 50 may consider that each virtual port has the same capabilities when selecting a port out which to send a message packet. The following are illustrative load balancing systems that the intermediate driver 50 may use; however, any currently existing or after developed load balancing system which can load balance across ports of substantially equal connectivity may be utilized. In some embodiments, load balancing is accomplished as a round-robin assignment to each virtual port for each message packet. In yet still other embodiments it may be desirable to assign each conversation between two devices to a particular port, such that all the message packets associated with the conversation are transmitted from the same port. In these embodiments, the intermediate driver 50 identifies a conversation between two devices (e.g., based on destination address and/or protocol of the communication (IP, TCP/IP, FTP)), and assigns each conversation a virtual port (and therefore the underlying physical port) based on a round-robin assignment.

The round-robin assignment mechanisms discussed in the immediately preceding paragraph forces the immediate driver 50 to keep historical information. That is, the intermediate driver 50 keeps a record of at least the last virtual port assignment so that the next virtual port can be identified. In yet still other embodiments, a load balancing system may be implemented by the intermediate driver that need not keep historical assignment information. An example of such a system is where the virtual port selected is based on destination MAC address. Consider, for example, a system having four virtual ports, the ports arbitrarily numbered (binary) 00, 01, 10 and 11. The virtual port could be selected by viewing the last (or any) two bits of the destination MAC address of the message packet, and the virtual port selected for the message packet being the virtual port whose number matches the last two bits of the destination MAC address. In yet still other embodiments, the last (or any) two bits of the destination address may be presented to a logical exclusive-or (XOR) function with the last (or any) two bits of the source MAC, and the result of the XOR function dictating the virtual port. In these embodiments, the intermediate driver 50 need not keep historical records of previous virtual port assignments.

The various embodiments discussed to this point show computer system 100 performing the transmit load balancing, however, the various embodiments are not limited to use on a computer system, and find applicability to network switch devices as well. Consider, for example, the system 400 of FIG. 4 comprising computer system 100 coupled to network switch device 82 and network devices 84 and 86. Network switch device 82 may be a layer 2 device (the forwards messages based on MAC addresses) or a layer 3 device (that forwards messages based on IP addresses). The network switch device 82 may comprise a processing circuit 88. The processing circuit may be an application specific integrated circuit (ASIC), discrete digital processing components, a processor that executes instructions, or a combination of any of these. The processing circuit 88 couples to each port of the switch, and also may couple to a memory 90. The memory 90 may be volatile or non-volatile.

Figure 4:
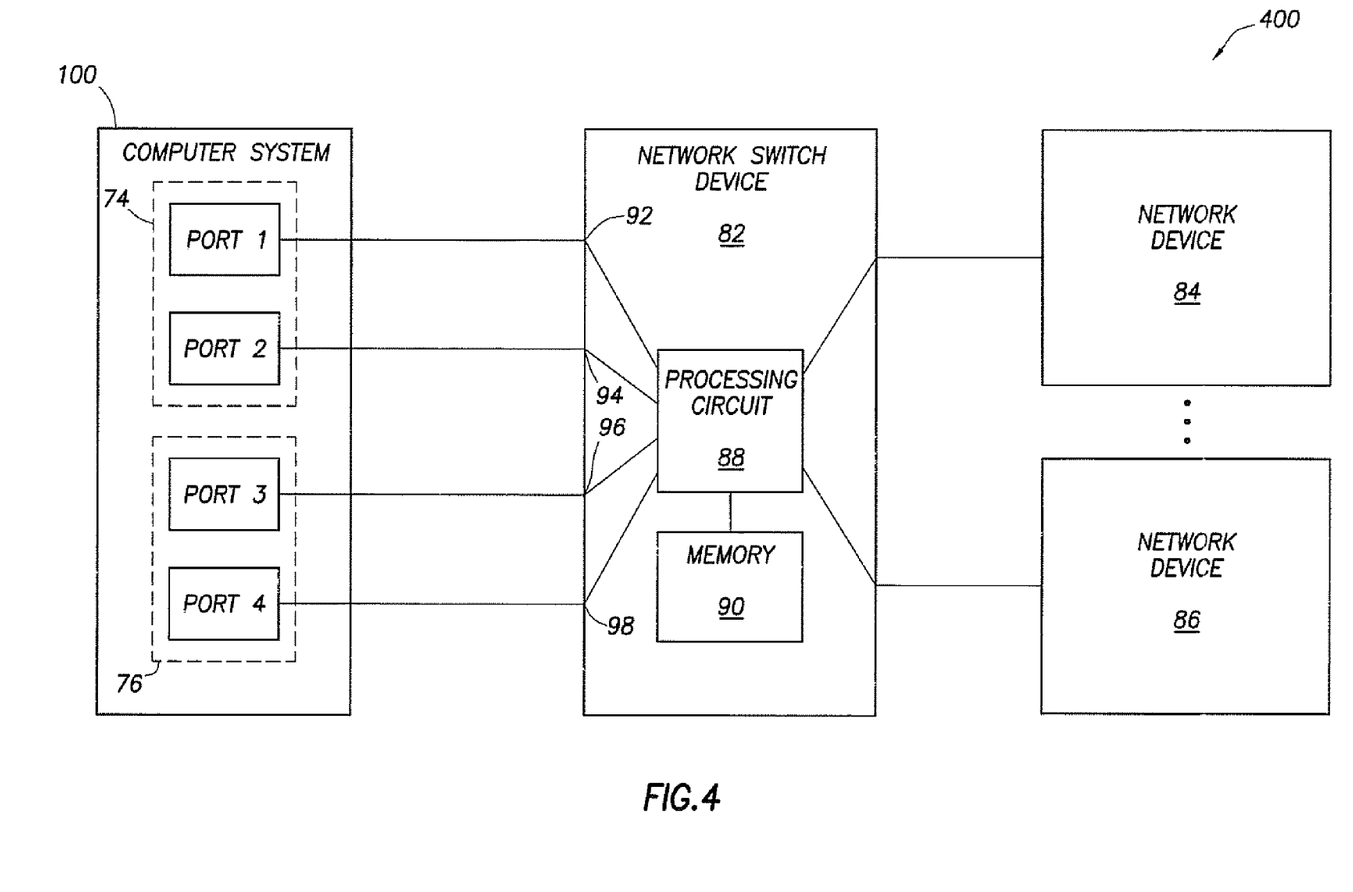
FIG. 4 illustrates an alternative system in accordance with some embodiments.

The processing circuit 88 teams any of the physical ports, such as illustrative physical ports 92, 94, 96 and 98 coupled to the computer system 100. For network switch devices, however, teaming may be alternatively referred to as "port trunking." When a message packet arrives at the network switch device 82 (e.g., from network device 84 or 86), the processing circuit 88 makes a determination of through which port to forward the message packet. When the destination device couples to the network switch device 82 by way of a set of port trunked physical ports (e.g., physical ports 92, 94, 96 and 98), the network switch device 82 can, and in some embodiments does, transmit load balance the message packet across the port trunked physical ports. Such load balancing may take place where any of the receiving ports of the target device are configured to receive using any possible MAC address, or where the receiving ports of the target device are all configured to receive using a particular MAC address.

Much like the embodiments discussed with respect to the computer system 100, the processing circuit 88 creates a plurality of virtual ports that map to or utilize the underlying physical ports. The number of virtual ports created for each physical port may be based on bandwidth of each port, throughput of each port in relation to the downstream network, a preference for one or more ports, loading of the ports, reliability of the ports, or communication delay for each port. Once the processing circuit has a set of virtual ports from which to choose, the processing circuit 88 applies a load balancing to select a virtual port out which to send a message packet. The load balancing may be any of the load balancing discussed above for computer system 100, any currently available load balancing system, or any load balancing system after-developed. Additionally for a network switch device, the load balancing may be a system where the last (or first) few bits of the source MAC address are considered in selecting a virtual port.

Again much like computer system 100, parameters associated with each physical port may change during operation, and in accordance with some embodiments the processing circuit 88 may change the number of virtual ports for each physical port to take into account these changes. The change to the number of virtual ports by the processing circuit 92 may change the effective load balancing at the physical port level with no, or minimal, disruption to transmission of message packets from the network switch device 82 to destination devices.

Figure 5:
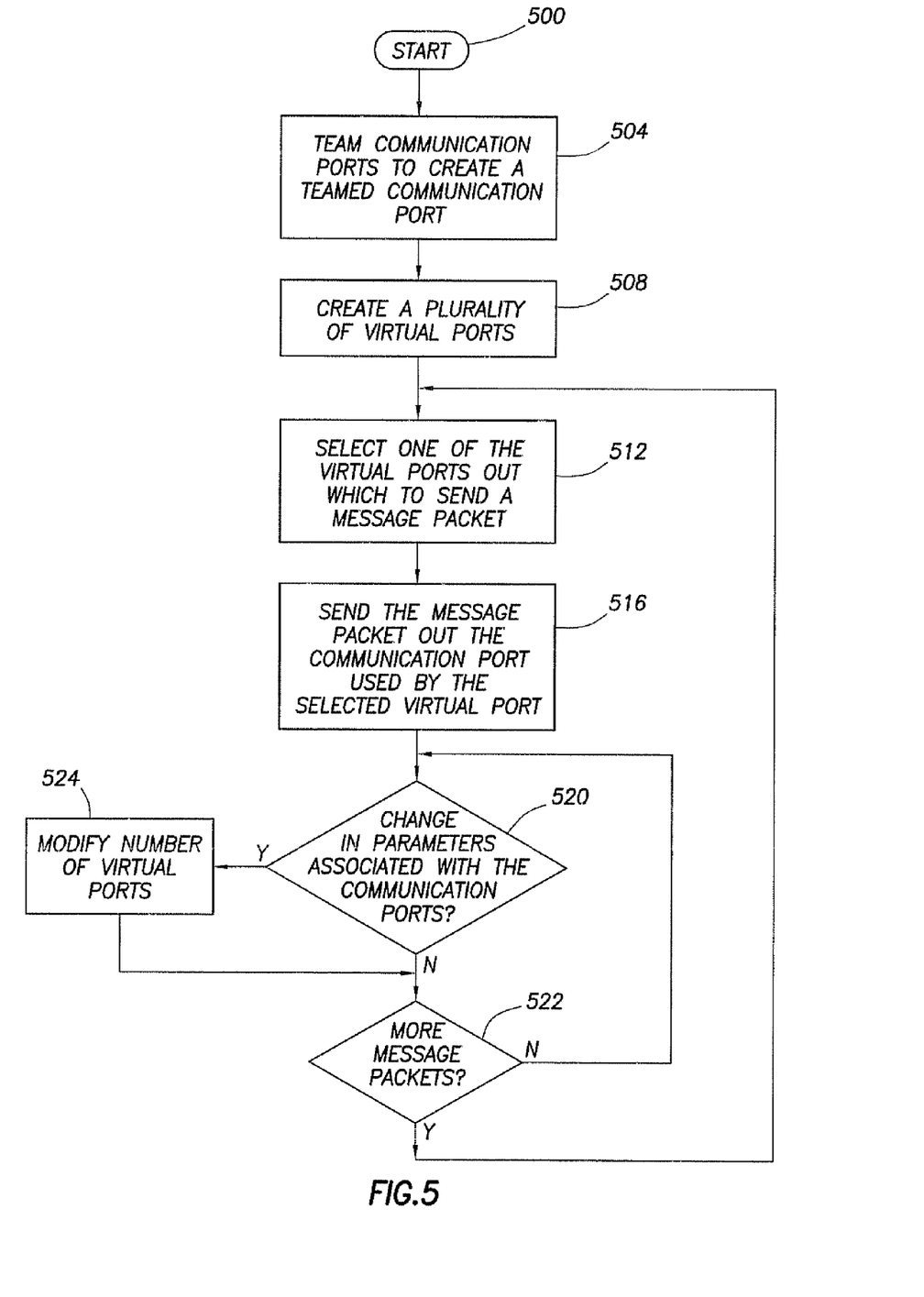
FIG. 5 illustrates a method in accordance with at least some embodiments

FIG. 5 illustrates a method in accordance with at least some embodiments. In particular, the method starts (block 500) and proceeds to teaming communication ports to create a teamed communication port (block 504). In embodiments implemented in computer system 100, the teaming may be accomplished by the intermediate driver 50. In embodiments implemented in a network switching device 82, the teaming may be referred to as port trunking, and the teaming may be accomplished by the processing circuit 88. Once the ports are teamed, a plurality of virtual ports is created (block 508). Creating the virtual ports may be based on parameters such as bandwidth of each physical port, throughput of each physical port in relation to the downstream network, a preference for one or more physical ports, loading of the physical ports, reliability of the physical ports, or communication delay for each physical port.

Regardless of underlying factors for the number of virtual ports created, a particular one of the virtual ports is selected out which to send a message packet (block 512). The selection of a particular port is to load balance the outbound message packets across the virtual ports. The load balancing system may take any form, such as message packet round-robin, conversation round-robin, or selection based on the source and/or destination MAC address. Once selected, the message packet is sent out the physical port to which the selected virtual port maps (block 516). After sending, a determination is made as to whether the parameters associated with the physical ports have changed (block 520). For example, the connectivity to the core switch of one of the physical ports may change. If there is a change in parameters associated with one or more of the physical ports, the number of virtual ports is modified (block 524).

If there was no change in the parameters of the of the physical ports (block 520), or if a change has been accounted for by changing the number virtual ports (again block 524), a determination is made as to whether there are further message packets to send (block 522). If there are no further message packets to send, the illustrative method retreats to checking for changes in parameters associated with the physical ports (block 520). If there are further message packets, the illustrative method retreats to selecting one of the virtual ports out which to send the message packet (block 512). While the illustrative method of FIG. 5 shows checking for changes in parameters after sending each message packet, in alternative embodiments the checking (and changing the number of virtual ports) need not take place that often, and instead may occur periodically (e.g., every few minutes), or after a sending a predetermined number of message packets.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention.

The above discussion is meant to be illustrative of the principles and various embodiments of the present invention. Numerous variations and modifications will become to those skilled in the art once the above disclosure is fully appreciated. It is intended that the following claims be interpreted to embrace all such variations and modifications.

What is claimed is:

1. A method comprising:

teaming a first and second communication ports to create a teamed communication port;

creating a plurality of virtual ports which abstract the first and second communication ports, each communication port has at least one virtual port assigned exclusively thereto, and wherein the number of created virtual ports exclusively utilizing each communication port is based on parameters associated with the communication port, wherein the parameters are based on one or more selected from the group comprising of: bandwidth, throughput capability of the networks to which the communication port couples, preference, loading, communication delay, and reliability;

selecting one of the plurality of virtual ports out which to send a message packet thus designating a selected virtual port, the selecting considers each virtual port to have the same throughput capability, and the selecting balances message packets sent across the plurality of virtual ports; and sending the message packets out the first or second communication port utilized by the selected virtual port.

2. The method as defined in claim 1 further comprising, between selecting and sending a first message packet and a selecting and sending a second message packet, modifying the number of the plurality of virtual ports as parameters associated with the communication port change.

3. The method as defined in claim 2 wherein modifying further comprises modifying based on one or more selected from the group consisting of: bandwidth of the first and second communication ports; throughput capability of the networks to which first or second communication ports couple; preference for one of the first and second communication ports; loading of the first and second communication ports; communication delay of the first and second communication ports; and reliability of the first and second communication ports.

4. The method as defined in claim 1 wherein selecting further comprises at least one selected from the group consisting of: selecting by round-robin load balancing across the plurality of virtual ports; selecting based on destination media access control (MAC) of the message packet; and selecting based on source MAC of the message packet.

5. A system comprising:

a processing circuit;

a main memory coupled to the processing circuit;

a first and second communication ports coupled to the processing circuit and configured to couple to a plurality of clients over a network, the communication ports configured to be teamed;

wherein the processing circuit creates a plurality of virtual ports, each communication port has at least one virtual port assigned exclusively thereto, and wherein the number of created virtual ports exclusively utilizing each communication port is based on parameters associated with the communication port;

wherein the parameters comprise one or more of: bandwidth, throughput capability of the networks to which the communication port couples, preference, loading, communication delay, or reliability;

wherein the processing circuit assigns a selected virtual port of the plurality of virtual ports out which to send a message packet, and when the processing circuit assigns the selected virtual port, the processing circuit attributes identical bandwidth capability to every virtual port and balances message packet transmission across the plurality of virtual ports.

6. The system as defined in claim 5 further comprising wherein the processing circuit modifies a number of the plurality of virtual ports between assigning the selected virtual port for the message packet and assigning another virtual port for another message packet.

7. The system as defined in claim 5 wherein the processing circuit further comprises a processor of a computer system.

8. The system as defined in claim 5 wherein the processing circuit further comprises a processing circuit of a network switch device.

9. The system as defined in claim 5 wherein the processing circuit assigns the selected virtual port based on one or more selected from the group: a round-robin basis for each message packet to be transmitted; a round-robin basis for identified conversation; each message packet's source address; or each message packet's destination address.

10. A computer-readable storage medium storing a program that, when executed by a processor, causes the processor to:
team a first and second communication ports to create a teamed communication port;
abstract the first and second communication ports by creation of a plurality of virtual ports; where each communication port has at least one virtual port assigned exclusively thereto, and wherein the number of created virtual ports exclusively utilizing each communication port is based on parameters associated with the communication port,
wherein the parameters comprise one or more of: bandwidth, throughput capability of the networks to which the communication port couples, preference, loading, communication delay, and reliability;
assign a selected virtual port of the plurality of virtual ports out which to send a message packet, and when assigning the selected virtual port, balance outbound message traffic across the plurality of virtual ports with each of the plurality of virtual ports having the same throughput capability.

11. The computer-readable storage medium as defined in claim 10 wherein when the program balances, the program further causes the processor to assign outbound message traffic to a particular one of the plurality of virtual ports by at least one selected from the group consisting of: a round-robin basis for each message packet; a round-robin basis for each conversation; based on each message packet's source address; and based on each message packet's destination address.

* * * * *